T. SCHERF & H. W. MERRICK.
VEHICLE CHOCK.
APPLICATION FILED JUNE 24, 1909.
945,613.
Patented Jan. 4, 1910.
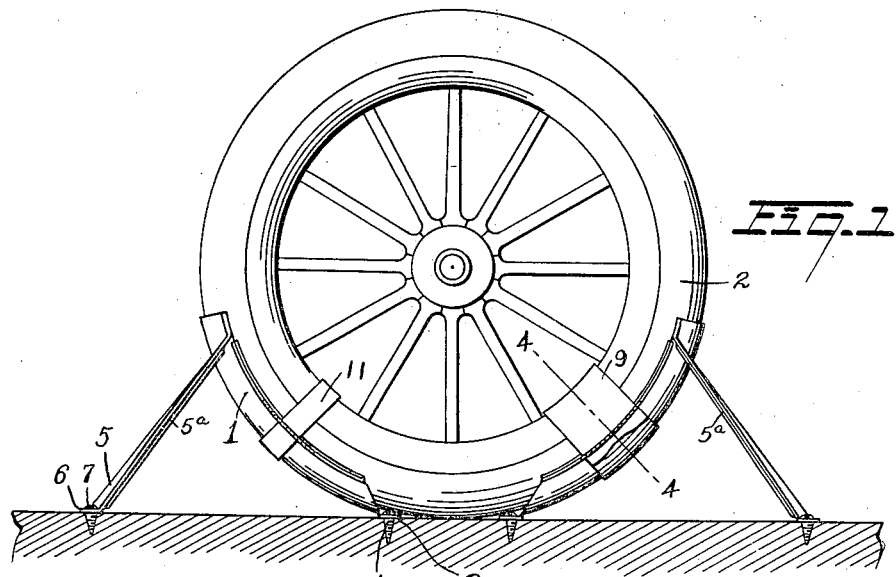
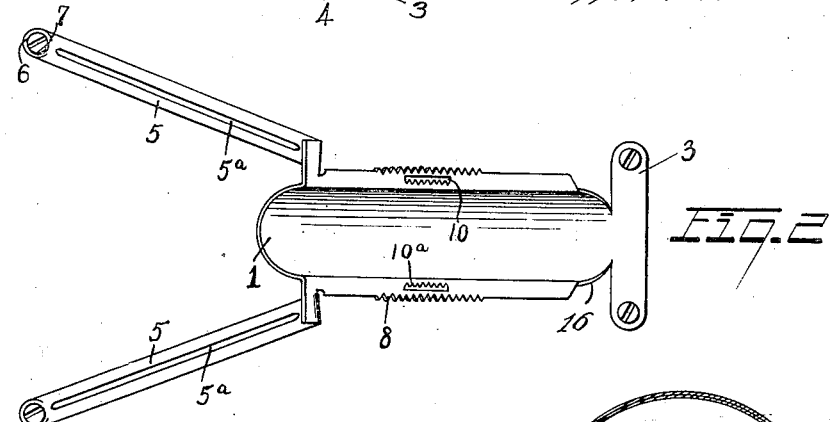
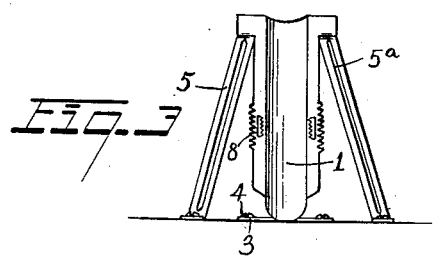
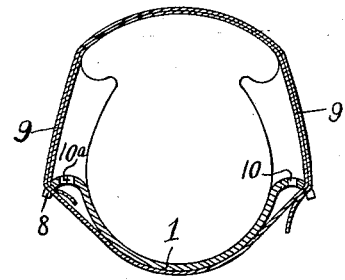
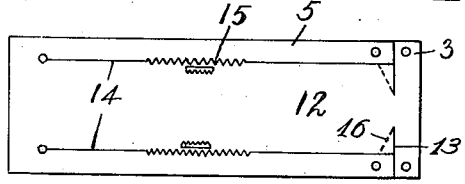
Witnesses:
N. F. Fretter
Brennan B. West
Inventors,
Theodor Scherf
Howard W. Merrick
by Bates, Fouts & Hull
Attys.

UNITED STATES PATENT OFFICE.

THEODORE SCHERF AND HOWARD W. MERRICK, OF CLEVELAND, OHIO.

VEHICLE-CHOCK.

945,613.  Specification of Letters Patent.  Patented Jan. 4, 1910.

Application filed June 24, 1909. Serial No. 504,032.

*To all whom it may concern:*

Be it known that we, THEODORE SCHERF and HOWARD W. MERRICK, both citizens of the United States, and both residing at Cleveland, in the county of Cuyahoga and State of Ohio, have invented a certain new and useful Improvement in Vehicle-Chocks, of which the following is a full, clear, and exact description, reference being had to the accompanying drawings.

This invention relates to chocks which are employed in the transportation of vehicles, such as automobiles, for the purpose of securing such vehicles against displacement and injury during shipment.

The objects of the invention are to provide chocks for this purpose which, while extremely simple and economical of production, are also especially well adapted for the purpose for which they are designed, viz: to prevent the dislodgment or movement of the vehicles by reason of shocks, oscillations, etc., incident to the movement of the car or other conveyance in which the vehicle may be shipped.

With the above general objects in view, the invention may be further defined as consisting of the combinations of elements embodied in the claims hereto annexed and illustrated in the drawings forming part hereof, wherein—

Figure 1 represents an elevation of a pair of chocks constructed in accordance with our invention, showing the same applied to the wheel of an automobile; Fig. 2 represents an enlarged plan view of one of the chocks shown in the preceding figure; Fig. 3 is an end elevation of one of the chocks; Fig. 4 is a sectional detail corresponding to the line 4—4 of Fig. 1; and Fig. 5 is a plan view of a metal blank from which the chock may be formed.

Describing the parts by reference characters, 1 denotes the body or tire-engaging portion of a chock. The chocks are preferably formed of metal pressed to shape and the body 1 is concaved longitudinally and transversely to correspond to the contour of a pneumatic tire 2. At its lower end, the chock is provided with feet 3, adapted to bear against the floor of the car or vessel in which the vehicle is transported, the chock being secured in place by means of screws 4 extending through said feet. At its upper end, the chock is provided with a pair of downwardly diverging legs 5 having feet 6 at the bottom thereof, by means of which they may be secured to the floor, as by means of screws 7.

The body 1 of the chock may be provided, intermediate of its ends, with a series of outwardly projecting prongs 8 on each side thereof. By reference to Fig. 4, it will be seen that the outer ends of these prongs are curved downwardly. These prongs are for the purpose of retaining in place bands 9 of canvas or similar material which may be engaged with the prongs and passed around the rim of the wheel, as shown at the right hand of Fig. 1, and in Fig. 4. In applying a band to these prongs, one end of the band will be engaged and penetrated by the prongs, near one end of the series, and the other end, after wrapping the band around the rim and chock, can be secured in place by penetration by the prongs at the other end of the series, on the same or opposite side of the body 1. Each chock may also be provided with slots 10, located near the central portion thereof and adjacent to each outer edge. These slots are for the reception of a strap or band 11, by means of which the wheel may also be secured in place. The bands 9 and the straps 11 may be used jointly or interchangeably and are for the purpose of preventing vertical movement of the vehicle away from the chocks. By serrating the inner edges of the slots, as shown at $10^a$, bands may be used with said slots, similar to the bands 9, the serrations serving to prevent the slipping of the bands.

In Fig. 5 we have shown a convenient manner of producing the chocks shown in the preceding figures. In this figure 12 denotes the body of a metal blank. This body will be provided with inwardly projecting slots 13 near one end thereof, to provide for the feet 3. From the slots 13 there extend longitudinal slots 14 which terminate a short distance from the other end of the blank. The metal outside of the slots 15 may then be bent in the manner shown in the preceding figures to form the legs 5. The prongs 8 are provided by making the slots 14 notched for a portion of their length, as shown at 15. The body of the blank is bent into the shape shown in Figs. 1 and 4, and the prongs turned slightly downwardly so as to penetrate the bands employed therewith. The slots 10 can be conveniently made in the blank before the latter is subjected to the bending operations. The lower corners of the body are preferably cut away from the inner ends of the slots 13, as indicated at 16, and the legs strengthened by ribbing or corrugating, as shown at 5ª.

Having thus described our invention, what we claim is:

1. A chock for securing vehicle wheels during shipment comprising a body which is concaved longitudinally and transversely to conform to the coöperating portion of the wheel, feet projecting from the lower end of said body by means of which it may be secured to the floor of the transporting conveyance, and legs for the upper end of said body having means whereby they may be secured to said floor.

2. A chock for securing vehicle wheels during shipment comprising a curved metallic body having intermediate of the ends thereof outwardly projecting prongs, and means whereby said body may be secured in engagement with a vehicle wheel and to the transporting conveyance.

3. A chock for securing vehicle wheels during shipment comprising a curved metallic body adapted to engage a portion of a wheel, said body being provided within the side edges thereof with slots, and means whereby the body may be secured in engagement with a wheel and to the transporting conveyance.

4. A chock for securing vehicle wheels during shipment comprising a curved metallic body adapted to engage a portion of a wheel, said body being provided within the edges thereof with slots having prongs, and means whereby the said body may be secured in engagement with a wheel.

5. A chock for securing vehicle wheels on conveyances during shipment comprising an elongated body curved longitudinally and transversely to conform to a portion of the wheel to be supported, said body having at the lower end integral feet and having at its upper end integral legs, and means for securing the feet and legs to the floor of the conveyance.

6. As a means for securing the wheels of vehicles in place during shipment, the combination of a pair of chocks each comprising a metallic body which is curved to engage the portion of the wheel with which it is employed, each of said chocks being provided with means adjacent to the lower end thereof whereby it may be secured to the transporting conveyance and having legs at its upper end, and means whereby said legs may be secured to the said conveyance.

7. A chock for securing vehicle wheels during shipment comprising a metallic body which is concaved longitudinally and transversely to conform to the coöperating portion of the wheel, means whereby the lower end of said body may be secured to the transporting conveyance, legs for the upper end of said body having means whereby they may be secured to said conveyance, and means whereby the said body may be secured to a wheel.

8. As a means for securing the wheels of vehicles during shipment, a pair of chocks each comprising a metallic body which is concaved longitudinally and transversely to conform to the coöperating portions of a vehicle wheel, each of said bodies being provided with integral feet at its lower end and having its upper end provided with legs having feet.

In testimony whereof, we hereunto affix our signatures in the presence of two witnesses.

THEODORE SCHERF.
HOWARD W. MERRICK.

Witnesses:
J. B. HULL,
ALLAN H. HEIDENREICH.